United States Patent [19]

Bakalov et al.

[11] Patent Number: 4,753,120
[45] Date of Patent: Jun. 28, 1988

[54] FRICTION IMPULSE TRANSMISSION MECHANISM

[75] Inventors: Ivan A. Bakalov; Sofka G. Popova, both of Sofia, Bulgaria

[73] Assignee: NPSK Po Kontrolno Zavarachni Raboti, Sofia, Bulgaria

[21] Appl. No.: 947,017

[22] Filed: Dec. 29, 1986

[51] Int. Cl.[4] .................. F16H 29/10; F16H 55/32
[52] U.S. Cl. ........................................ 74/117; 74/164
[58] Field of Search .............. 74/112, 116, 122, 125, 74/125.5, 163–166, 117; 192/80, 81 R

[56] References Cited

U.S. PATENT DOCUMENTS

| 844,730 | 2/1907 | Krause | 74/164 |
|---|---|---|---|
| 1,379,212 | 5/1921 | Ramsey | 74/163 |
| 1,396,335 | 11/1921 | McDonald | 74/163 |
| 1,700,562 | 1/1929 | Doll | 74/164 |
| 3,340,743 | 9/1967 | Stageberg | 74/116 |
| 3,404,616 | 10/1968 | Koeber | 74/164 |
| 4,242,050 | 12/1980 | Oakes | 74/125.5 |

FOREIGN PATENT DOCUMENTS

| 1361222 | 4/1964 | France | 74/116 |
|---|---|---|---|
| 862907 | 3/1961 | United Kingdom | 74/122 |

*Primary Examiner*—Lawrence Staab
*Attorney, Agent, or Firm*—Klein and Vibber

[57] ABSTRACT

A friction impulse transmission mechanism, which finds application in mechanism engineering, electrical industry and power engineering for impulse driving of mechanisms allow a broad range of regulation of the revolutions, reduced skidding between the flexible elements and the end shaft, prolonged life-time and a constant transmission ratio.

The mechanism comprises a driving shaft and an endshaft enveloped by two flexible elements. According to the invention the driving shaft is a crankshaft with two cranks disposed at a distance of 180 degrees one from the other, and the two flexible elements are each connected at one end to a tightening device. In the zone between the end points where the flexible elements fit the end shaft and the place where the flexible elements are connected to the driving shaft there is connected a device for stretching the flexible elements. In one embodiment, the device for tightening the flexible elements is a spring, and the stretching device represents another spring connected to a mechanism for altering its force. In another embodiment, the device for tightening the flexible elements can represent a rigid element the two ends of which are hinged to the corresponding ends of the flexible elements, a tightening spring being hinged by means of a holder to the middle of the rigid element. The stretching device represents another rigid element the two ends of which are hinged to the flexible elements, the middle of said rigid element being hinged to a regulating rigid stretching device.

3 Claims, 2 Drawing Sheets

FRICTION IMPULSE TRANSMISSION MECHANISM

BACKGROUND OF THE INVENTION

The invention relates to a friction impulse transmission mechanism, which finds application in mechanical engineering, electrical industry and power engineering for impulse driving of mechanisms.

A known friction impulse transmission mechanism is disclosed in Leonov, A. I., *Microhrapovie mechanizmi svobodnogo hoda*, Izdatelstvo "Mashinostroenie", 1982. The known mechanism, consists of a driving shaft with a ratchet and an end shaft, representing two truncated cones lying one beside the other on two parallel axes with their bases one opposite the other and enveloped by a flexible movable element.

A disadvantage of the known mechanism is the small range of regulation of the revolutions due to skidding in the friction impulse transmission mechanism with a great difference between the diameters of the truncated cones, as well as wear of the truncated cones caused by skidding when locking with the ratchet for impulse rotation.

It is an object of the present invention to provide a friction impulse transmission mechanism with a broad range of regulation of the revolutions, reduced skidding between the flexible elements and the end shaft, prolonged life-time and a constant transmission ratio.

SUMMARY OF THE INVENTION

The noted disadvantage of the prior art is avoided by the present invention which comprises a driving shaft and an end shaft enveloped by a flexible element. According to the present invention the driving shaft is a crankshaft with two cranks disposed 180 degrees apart. Two flexible elements are arranged, one end of each being connected to a respective crank of the driving shaft, and the other end of each flexible element being connected to a tightening device. In the zone between the end points where the flexible elements fit the end shaft and the place where the flexible elements are connected to the driving shaft there is connected a device for stretching the flexible elements.

The device for tightening the flexible elements may be a spring device, and the stretching device may also be a spring device, but connected to a mechanism for altering its force. The device for tightening the flexible elements can also be a rigid element, the two ends of which are hinged to the corresponding ends of the flexible elements, a tightening spring being hinged by means of a holder to the middle of the rigid element. The stretching device may also be a rigid element the two ends of which are hinged to the flexible elements, the middle of said rigid element being hinged to a regulating rigid stretching device.

An advantage of the friction impulse transmission mechanism is the ability to regulate the revolutions within broad ranges, reduced skidding between the flexible elements and the end shaft, considerably prolonged life-time, increased reliability and a constant transmission ratio.

BRIEF DESCRIPTION OF THE DRAWING

Exemplary embodiments of the invention are shown in the enclosed drawing in which.

DESCRIPTION OF THE PREFERRED EMBODIMENTS

Figure 1:
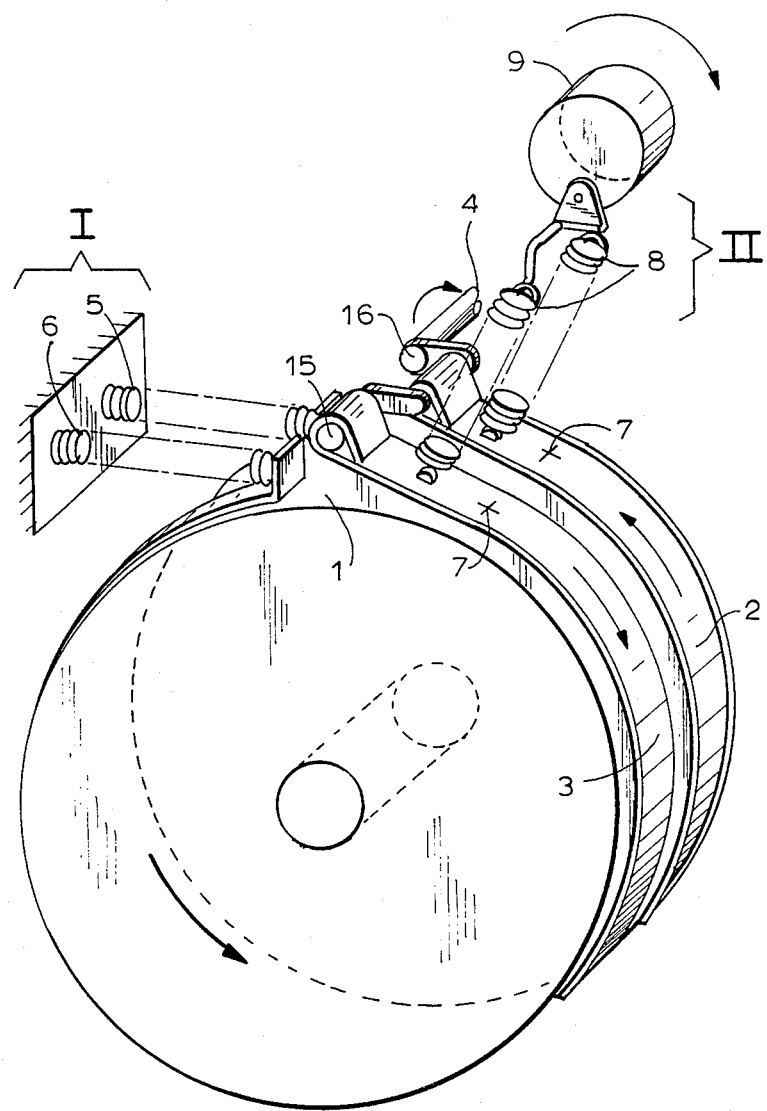
FIGS. 1 and 2 are perspective views which represent two variants for realizing the device for tightening and the device for stretching the flexible elements.
Figure 2:
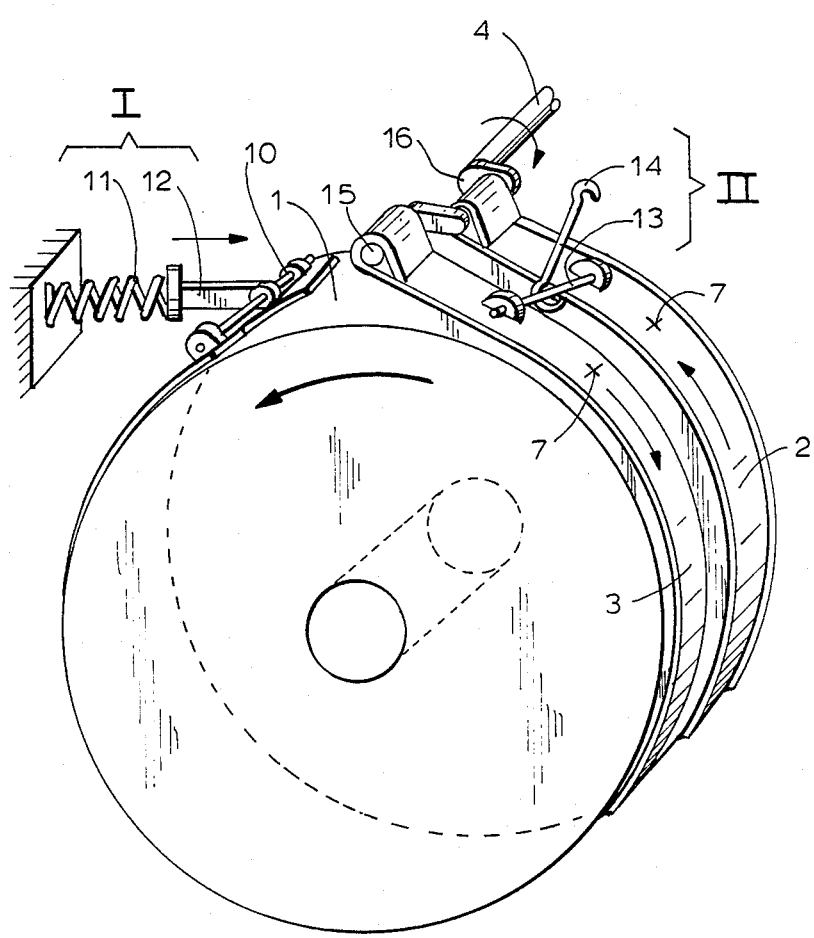

Referring to FIGS. 1 and 2, the friction impulse transmission mechanism consists of an end shaft 1 enveloped by two flexible elements 2 and 3. Each flexible element 2, respectively 3 has two ends, one of which ends is connected to a crank 15, respectively 16 of a driving shaft 4, said cranks being disposed at a distance of 180 degrees one from the other. The other end of each flexible element 2, 3 is connected to a tightening device I.

In the zone between the end points 7 where the flexible elements 2, 3 fit the end shaft 1 and the places where the flexible elements 2, 3 are connected to the driving shaft 4, there is connected a device II for stretching the flexible elements 2 and 3.

According to the exemplary implementation shown in FIG. 1 the device I for tightening the flexible elements 2 and 3 represents a spring 5, 6 and the stretching device II represents a spring 8, connected to a mechanism 9 altering its force.

According to the exemplary implementation in FIG. 2 the tightening device I represents a rigid element 10, the two ends of which are hinged to the corresponding ends of the flexible elements 2, 3. A tightening spring 11 is hinged by means of a holder 12 to the middle of the rigid element 10. The device II for stretching the flexible elements 2, 3 represents a rigid element 13, the two ends of which are hinged to the flexible elements 2, 3. The middle of the rigid element 13 is hinged to a regulating rigid stretching device 14.

The friction impulse transmission mechanism operates in the following manner:

When the driving shaft 4 rotates the ends of the flexible elements 2, 3 connected thereto perform circular motion which gradually passes over to reciprocal motion with opposite directions. When the flexible element 2 during its motion tightens the tightening device I, a pressing force is created of the flexible element 2 to the end shaft 1 and simultaneously the end shaft 1 rotates together with the flexible element 2. In the meantime the flexible element 3 moves in the opposite direction and releases the tightening device I which causes reduction of tne pressing force of the flexible element 3 to the end shaft 1. Thus there is provided unidirectional rotation of the end shaft 1.

The same is achieved when the two flexible elements 2 and 3 change the direction of their motion.

When tightening the stretching device, e.g. the springs 8 through the mechanism 9 or the regulating rigid stretching device 14, in the zone between the driving shaft 4 and the points 7 where the flexible elements 2 and 3 fit the end shaft 1, there occurs a slack of the flexible elements 2 and 3. The driving shaft 4 has to remove the slack of the flexible elements 2 and 3 so as to be able to shift one of them in the direction of rotation of the end shaft 1. If their slack is greater than the run of the driving shaft 4, the end shaft 1 stops rotating.

Thus, the mechanism 9 may be set in any desired position (depending on the desired rotative speed of end shaft 1) and remain immovable until it is necessary or desirable to alter the rotative speed of the end shaft 1. As shown in the figures, tightening device I exerts a tightening force against flexible elements 2 and 3 vis a vis end shaft 1. In order to control the contact between the flexibal elements and the shaft, stretching device II is employed and controlled by mechanism 9 as shown in the figures and described above. Therefore, by adjusting mechanism 9, the stretching of the flexible elements can be either increased or decreased. As the stretching is increased, the rotative speed of the end shaft is reduced. In the embodiment of FIG. 1, the stretching device II is simply a pair of springs 8 which are attached to the flexible elements respectively and pulled by cam like mechanism 9. In the embodiment of FIG. 2, the the stretching device II is simply a rigid element 13, the two ends of which are attached to the flexible elements respectively and the center of the element 13 can be pulled by a hook like element 14.

Although the invention is described and illustrated with reference to two preferred embodiments thereof, it is to be expressly understood that it is in no way limited to the disclosure of such preferred embodiments but is capable of numerous modifications within the scope of the appended claims.

We claim:

1. A friction impulse transmission mechanism comprising a driving shaft and an end shaft, and two flexible elements, said driving shaft being a crankshaft with two cranks disposed at 180 degrees of each other, each flexible element having two ends, one end of each flexible element being connected to one of said cranks of the driving shaft and the other end of each flexible element being connected to a tightening means, said tightening means urging said flexible elements towards said end shaft, both of said flexible elements embracing said end shaft in such a way that there is created a zone on each flexible element between an end point where said flexible element fits the end shaft and a point where said flexible element is connected to said crank of the driving shaft, and means for stretching the flexible elements, said stretching means being connected to said flexible elements at a place in said zone and selectively urging said flexible elements in a direction away from said end shaft.

2. A friction impulse transmission mechanism, as claimed in claim 1, wherein said tightening means comprises a spring and said stretching means comprises a second spring connected to means for altering the force of said second spring.

3. A friction impulse transmission mechanism, as claimed in claim 1, wherein said tightening means comprises a rigid element having two ends which ends are hinged to the corresponding ends of the flexible elements, a tightening spring being hinged by means of a holder to the middle of the rigid element, and said stretching means comprises a second rigid element having two ends, the two ends of which are hinged to the flexible elements, the middle of this second rigid element being hinged to a regulating rigid stretching device.

* * * * *